United States Patent
Vozhdaev et al.

(10) Patent No.: US 8,256,284 B2
(45) Date of Patent: Sep. 4, 2012

(54) SYSTEM FOR ACQUIRING AIR DATA DURING FLIGHT

(75) Inventors: Yevgeny Semenovich Vozhdaev, Moscow (RU); Andrey Viktorovich Vyalkov, Moscow Region (RU); Mikhail Alekseevich Golovkin, Moscow Region (RU); Andrey Aleksandrovich Efremov, Moscow Region (RU); Vladimir Georgievich Kravtsov, Moscow (RU); Oleg Ivanovich Nazarov, Moscow (RU); Vyacheslav Nikolaevich Dyatlov, Moscow (RU); Aleksandr Sergeevich Klimov, Moscow (RU)

(73) Assignees: Federalnoe gosudarstvennoe unitarnoe predprijatie "Central Aerohydrodynamic Institute" (FGUP "TSAGI"), Vhukovsky, Moscow Region (RU); Otkrytoe Aktsionernoe Obschestvo "AEROPRIBOR-VOSKHOD", Moscow (RU); Federal State Budgetary Institution "Federal Agency for Legal Protection of Military, Special and Dual Use Intellectual Activity Results" (FSBI "FALPIAR"), Moscow (RU)

( * ) Notice: Subject to any disclaimer, the term of this patent is extended or adjusted under 35 U.S.C. 154(b) by 1177 days.

(21) Appl. No.: 11/991,039
(22) PCT Filed: Aug. 22, 2006
(86) PCT No.: PCT/RU2006/000442
  § 371 (c)(1),
  (2), (4) Date: Apr. 15, 2008
(87) PCT Pub. No.: WO2007/024159
  PCT Pub. Date: Mar. 1, 2007

(65) Prior Publication Data
  US 2009/0055036 A1    Feb. 26, 2009

(30) Foreign Application Priority Data
  Aug. 26, 2005 (RU) ................. 2005126949

(51) Int. Cl.
  *G01P 3/00* (2006.01)
(52) U.S. Cl. ................................... 73/170.02
(58) Field of Classification Search ............... None
  See application file for complete search history.

(56) References Cited

U.S. PATENT DOCUMENTS
3,120,123 A * 2/1964 Werner et al. ............... 73/182
(Continued)

FOREIGN PATENT DOCUMENTS
EP  0 249 848  12/1987
(Continued)

OTHER PUBLICATIONS
International Search Report.
(Continued)

*Primary Examiner* — Andre Allen
(74) *Attorney, Agent, or Firm* — Collard & Roe, P.C.

(57) ABSTRACT

An air data system includes pitot pressure probes with sensing ports, anti-icing electric heaters, conduits, pressure transducers, outer air temperature sensors, and a computer incorporated in a single streamlined housing attached to the aircraft and composed of axisymmetric surfaces. The system is autonomous and interacts with the aircraft and its subsystems through only the information exchange channels and power supply lines via electric connectors. The housing also incorporates electric adapters and the system includes pitot pressure probes which are faceted pins protruding from the housing having sensing ports between edges. The housing surface or its part can be made of hydrophobic materials. The system can include a set of independent subsystems wherein the units and components are housed in individual streamlined housings attached to aircraft components. The subsystems are autonomous and interact with the aircraft and the other subsystems through the information exchange and power supply lines only.

14 Claims, 15 Drawing Sheets

U.S. PATENT DOCUMENTS

| | | | |
|---|---|---|---|
| 3,329,016 A | | 7/1967 | Leavens et al. |
| 3,572,126 A | * | 3/1971 | White et al. ............... 73/384 |
| 4,768,386 A | | 9/1988 | Taddeo |
| 5,299,455 A | | 4/1994 | Mangalam |
| 5,406,839 A | | 4/1995 | Leblond et al. |
| 5,423,209 A | | 6/1995 | Nakaya et al. |
| 6,038,932 A | * | 3/2000 | Wandel et al. ............ 73/861.65 |
| 6,419,186 B1 | | 7/2002 | Bachinski et al. |
| 6,568,260 B2 | * | 5/2003 | Hakenesch ............... 73/178 R |
| 6,679,112 B2 | | 1/2004 | Collot et al. |
| 7,036,365 B2 | | 5/2006 | Choisnet |
| 7,490,510 B2 | * | 2/2009 | Agami et al. ............ 73/170.02 |
| 2001/0054311 A1 | * | 12/2001 | Hakenesch ............... 73/170.02 |
| 2005/0193812 A1 | * | 9/2005 | Ice ............... 73/170.02 |
| 2005/0273292 A1 | * | 12/2005 | Severson et al. ............ 702/130 |
| 2007/0107510 A1 | * | 5/2007 | Agami et al. ............ 73/182 |

FOREIGN PATENT DOCUMENTS

| | | |
|---|---|---|
| EP | 1 020 717 | 7/2000 |
| FR | 2 802 636 | 6/2001 |
| RU | 2 037 157 | 6/1995 |
| RU | 2 042 137 | 8/1995 |
| RU | 2 115 102 | 10/1998 |
| RU | 41875 | 11/2004 |
| WO | WO 02/086516 | 10/2002 |

OTHER PUBLICATIONS

A.N. Petunin "Methods and Technique of Measuring the gas flow parameters", Mashinostroenie Publishing House, Moscow, 1972. (With English Abstract) (Spec, p. 1—see Third Preliminary Amendment).

Kozitsyn, V. K. et al., "Analyzing the concept of helicopter air data system," Aviakosmicheskoye priborostroyeniye Journal, 2003, No. 10. With English Abstract) (Spec, p. 1).

Soldatkin, V. V., "Integrated system for measuring low air speeds," Proceedings of XII International Workshop, MGU Publshing Office, 2004, pp. 397-398. With English Abstract) (Spec, p. 2).

English translation of International Preliminary Report on Patentability and Written Opinion of the International Searching Authority for PCT/RU2006/000442) dated May 29, 2008.

\* cited by examiner

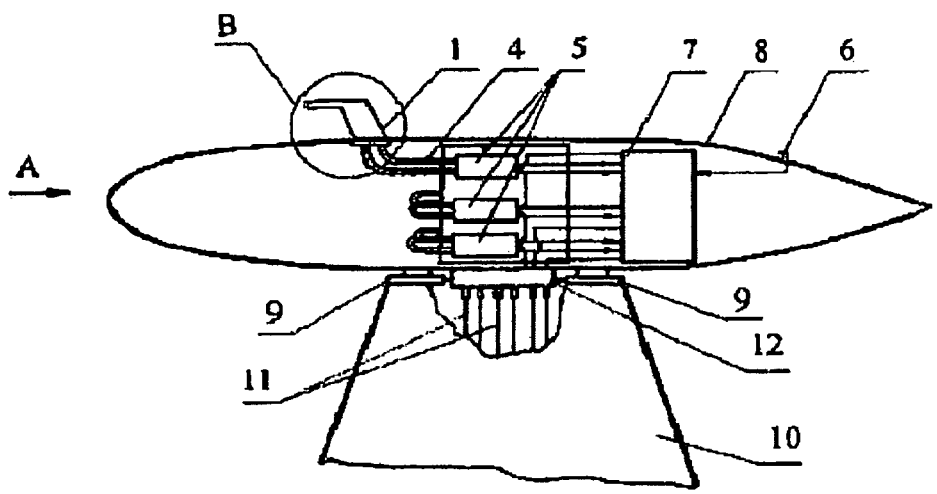
FIG 1a
View A
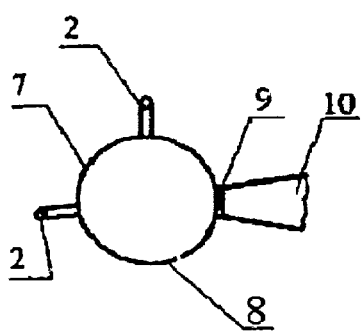
FIG 1b
View B
(enlarged)
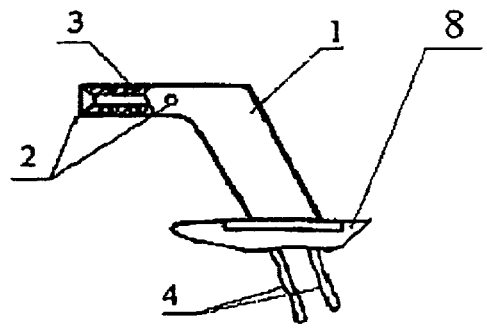
FIG 1c
FIG 1

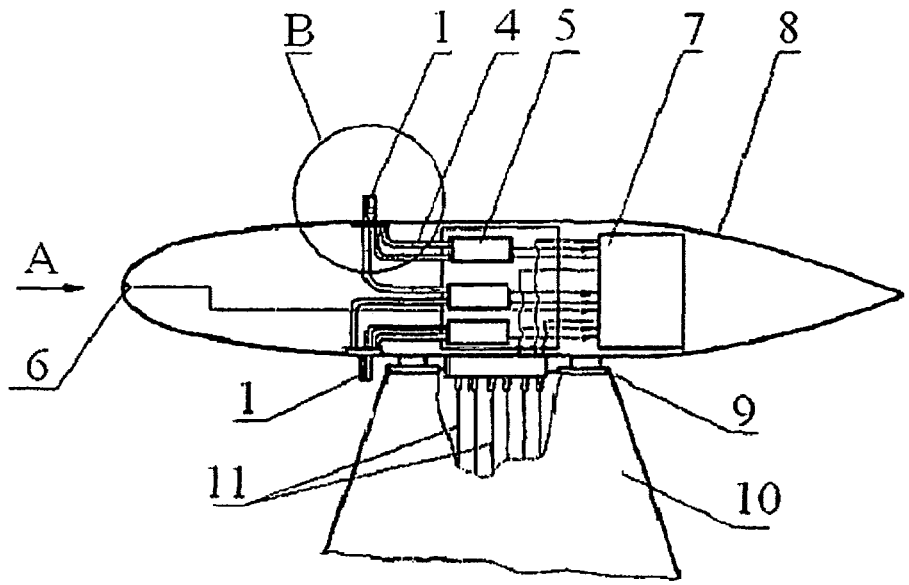
FIG 3a
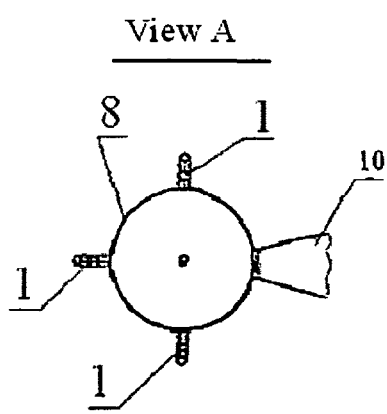
FIG 3b
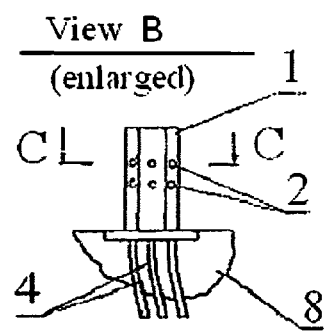
FIG 3c
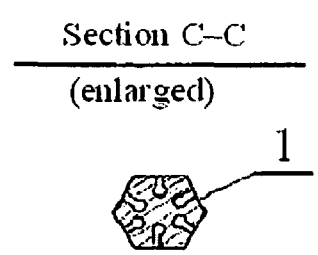
FIG 3d
FIG 3

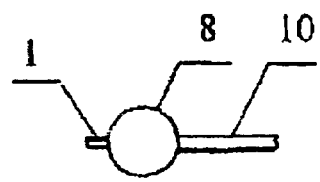
FIG 4a
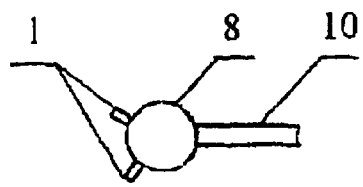
FIG 5a
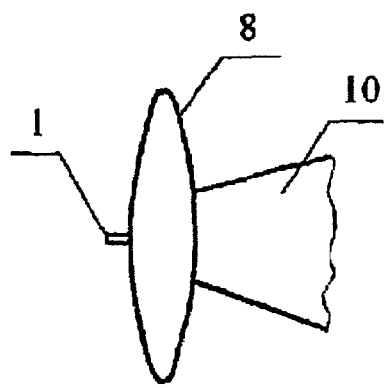
FIG 4b
FIG 4
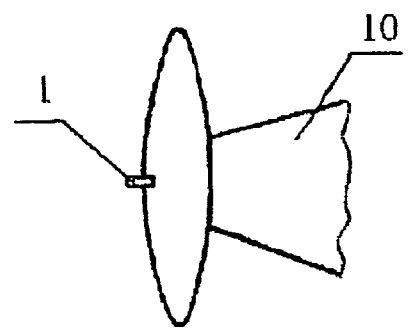
FIG 5b
FIG 5
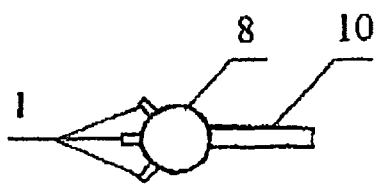
FIG 6a
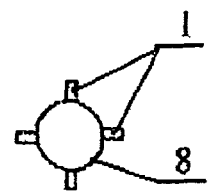
FIG 7a
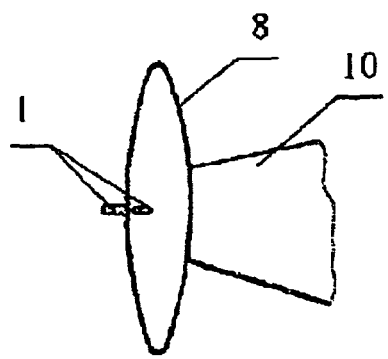
FIG 6b
FIG 6
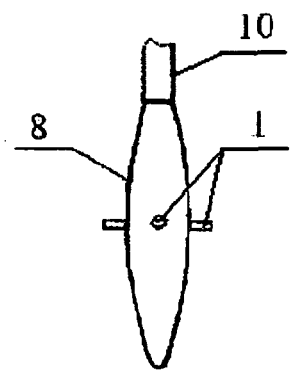
FIG 7b
FIG 7

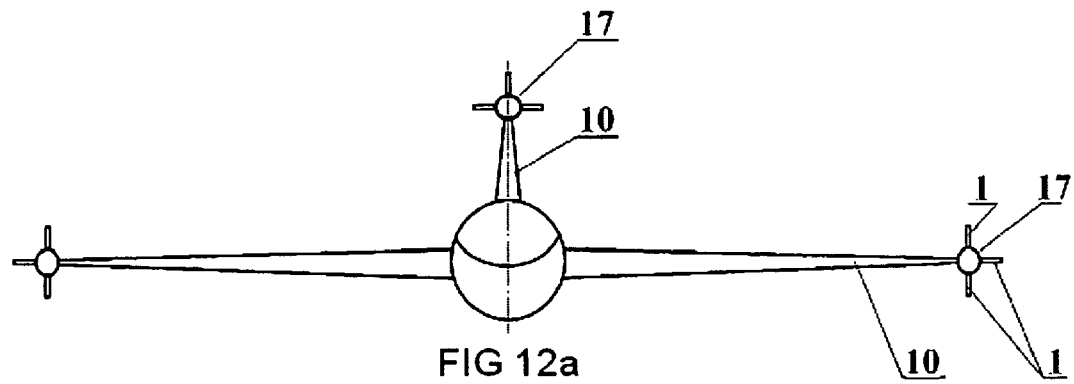
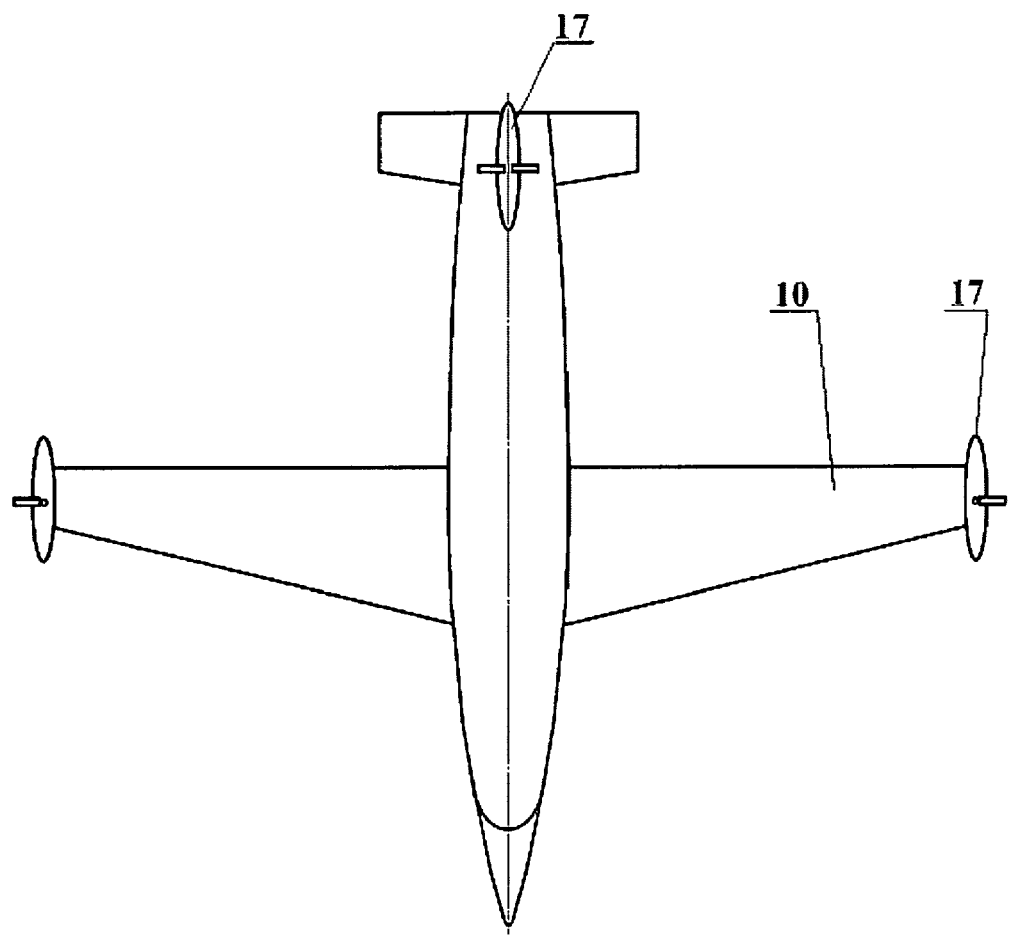
FIG 12b
FIG 12

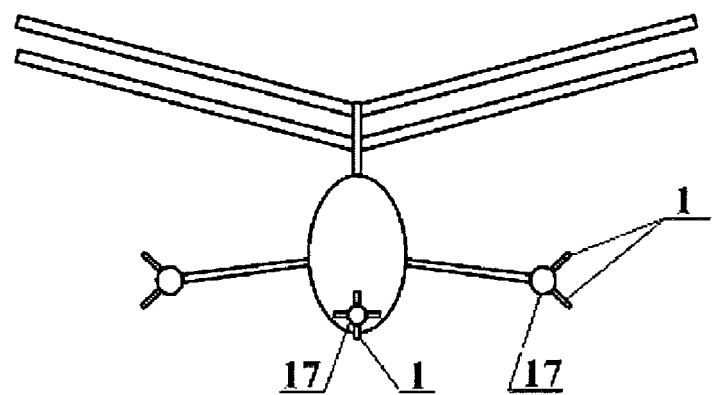
FIG 13a
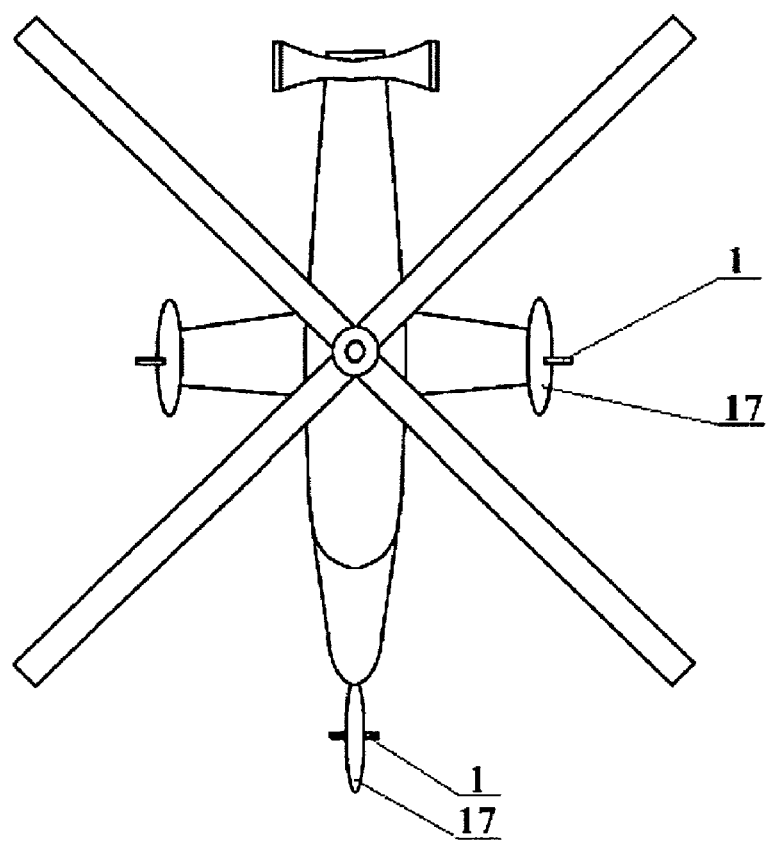
FIG 13b
FIG 13

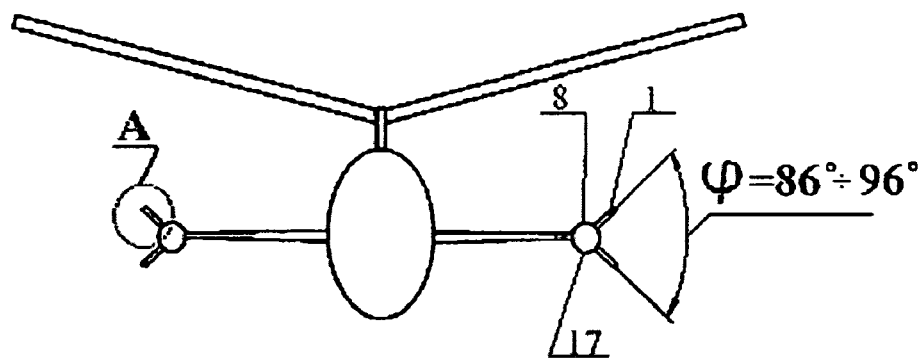
FIG 14a
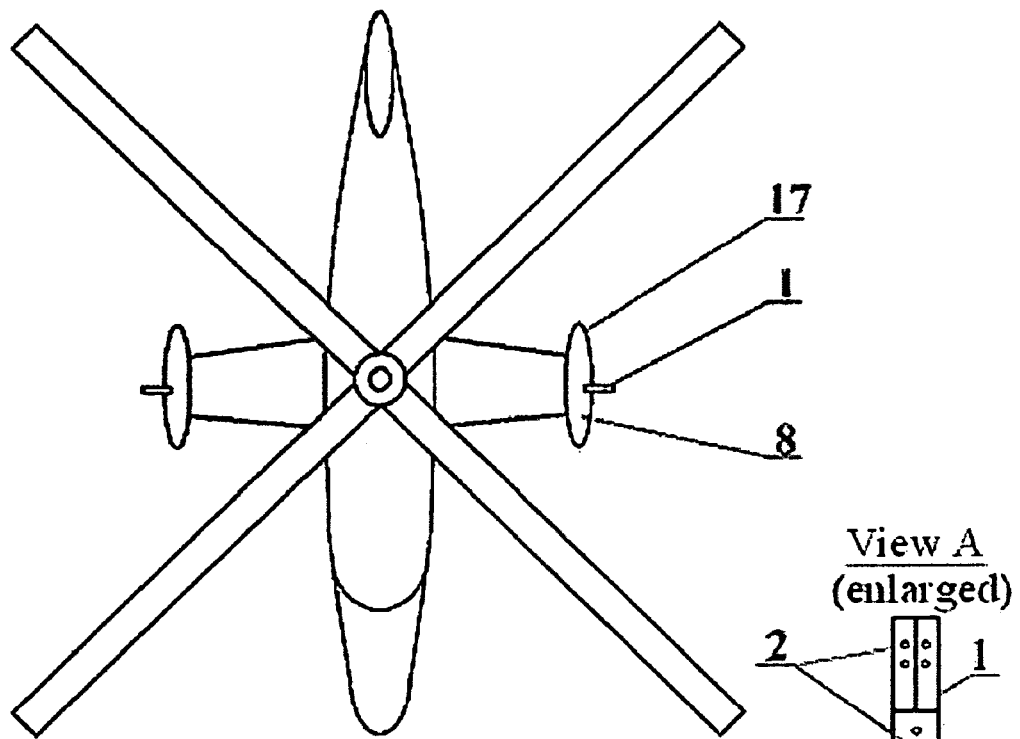
FIG 14b
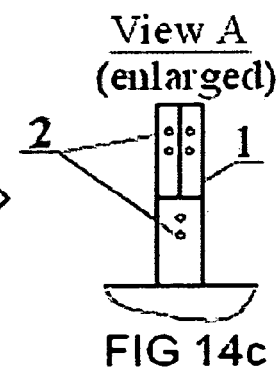
FIG 14c
FIG 14d
FIG 14

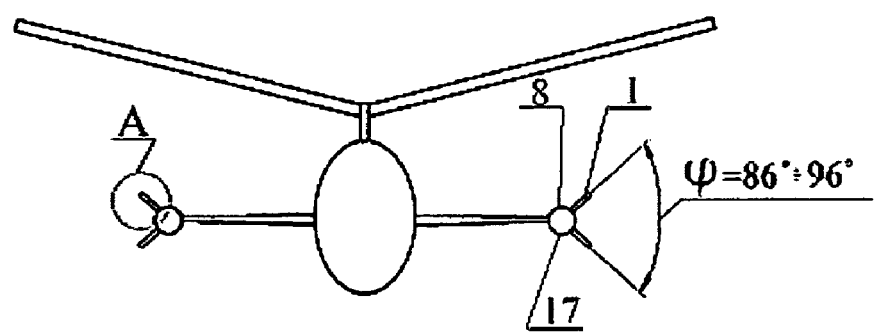
FIG 15a
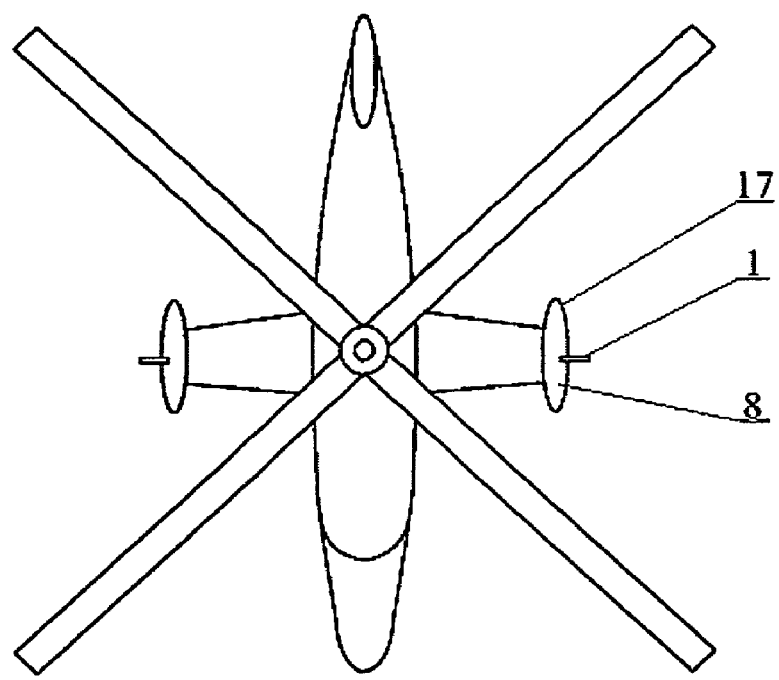
FIG 15b
FIG 15c
FIG 15d
FIG 15

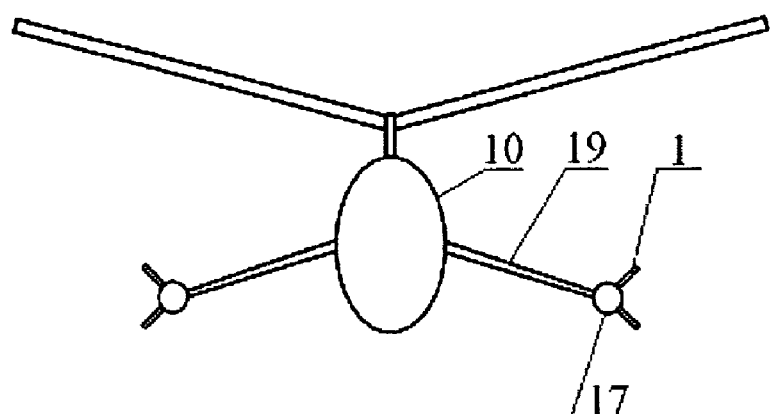
FIG 17a
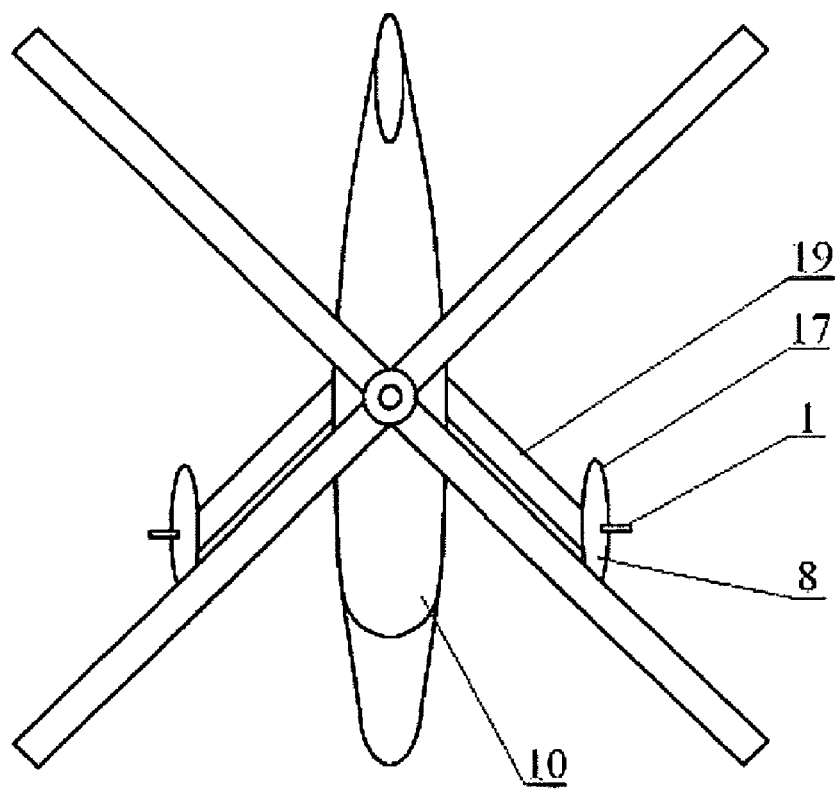
FIG 17b
FIG 17

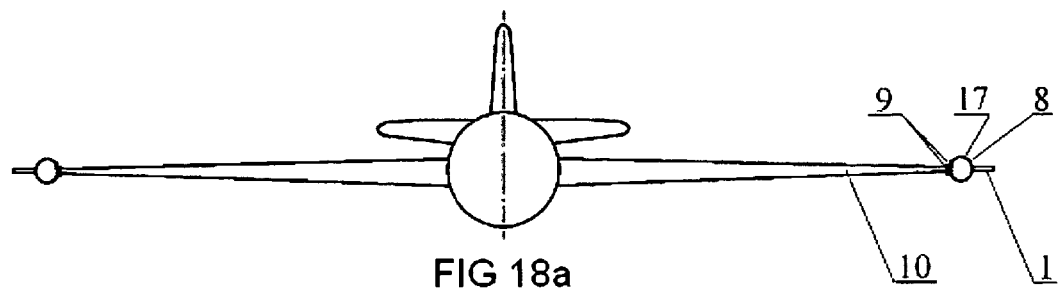
FIG 18a
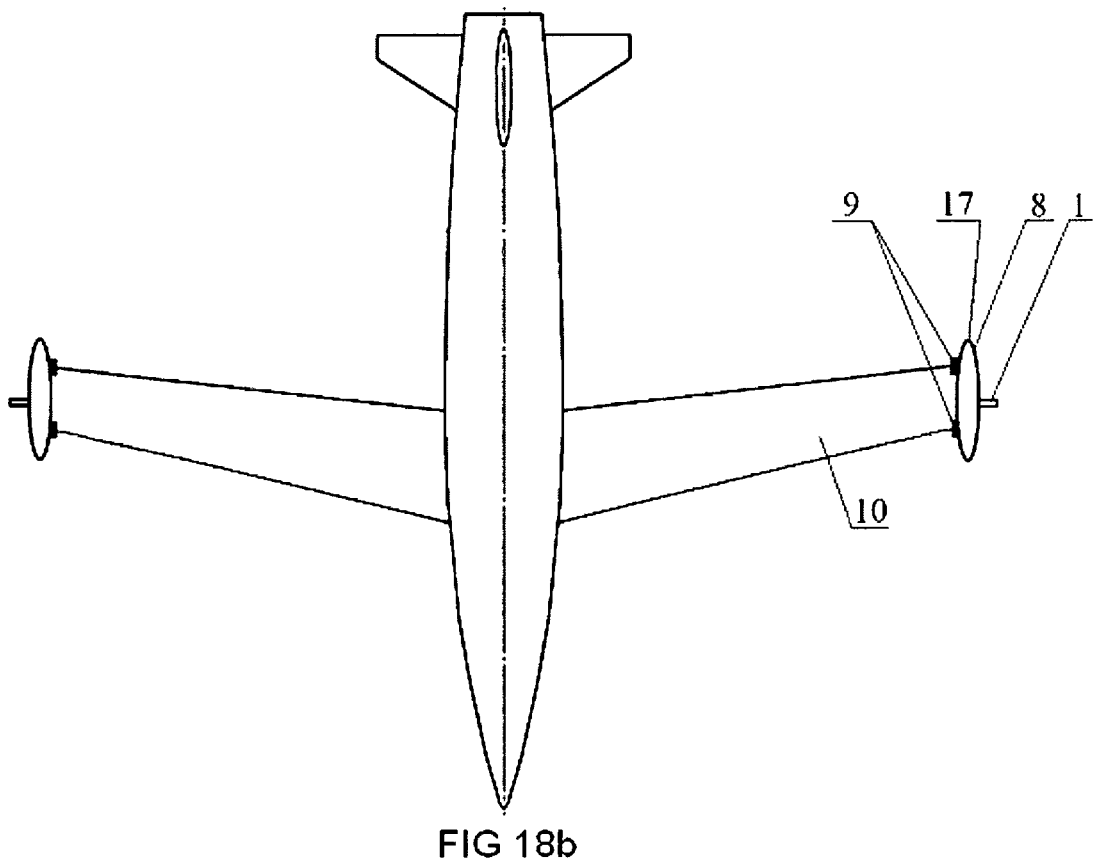
FIG 18b
FIG 18

SYSTEM FOR ACQUIRING AIR DATA DURING FLIGHT

CROSS REFERENCE TO RELATED APPLICATIONS

Applicants claim priority under 35 U.S.C. §119 of Russian Application No. 2005126949 filed Aug. 26, 2005. Applicants also claim priority under 35 U.S.C. §365 of PCT/RU2006/000442 filed Aug. 22, 2006. The international application under PCT article 21(2) was not published in English.

The present invention relates to aviation—in particular, to acquiring the air data onboard an air vehicle.

Measuring the flight (flow) parameters is one of the most important problems in aircraft aerodynamics. Currently, flight parameters are measured by using pitot pressure probe which are usually mounted onto a fuselage or other aircraft components. As a rule, an aircraft carries a plurality of the probes measuring local parameters of a flow that is almost laminar. The true parameters are determined on the basis of preliminary calibration of the pitot pressure probe. The flight parameter measurement is very important for flying the agile airplane in view of the notable expansion of flight angles of attack and speed range (from low subsonic to high supersonic values). Of importance it is also for flying a helicopter because the air vehicle features high maneuverability (the capability to fly fore and aft, to the left and to the right, and up and down) and the flight should be automated on the basis of signals from the air data system (for example, see the following: A. N. Petunin "Methods and Technique of Measuring the gas flow parameters", Mashinostroenie Publishing House, Moscow, 1972; Russian Federation patent #2042137, Int. Cl. G01P5/16, 1993; U.S. Pat. No. 5,406,839, Classes 73/180, 73/170.02, and 73/202, 1995; France patent #2802636, Int. Cl. G01L7/00, 1999; V. K. Kozicyn et al., "Analyzing the concept of helicopter air data system", Aviakosmicheskoye priborostroyeniye Journal, 2003, No. 10).

The most relevant among the previous art (e.g., refer to U.S. Pat. No. 3,329,016, Class 73/178X, 1967; European patent #0249848, Int. Cl. G01P15/00, 1987; U.S. Pat. No. 4,768,386, Classes 73/861/66 and 73/147, 1988; U.S. Pat. No. 5,299,455, Classes 73/180, 181, 147, and 204.11, 1994; Russian Federation patent #2037157, Int. Cl. G01P5/16, 1995; U.S. Pat. No. 5,423,209, Classes 73/182 and 73/861.66, 1995; WO 2086516, Int. Cl. G01P5/165, 2003; Russian Federation patent #41875 for useful design, Int. Cl. G01P5/00, 2004; V. V. Soldatkin, "Integrated system for measuring low air speeds", Proceedings of XII international workshop, MGU Publishing Office, 2004, pp. 397-398) is the air data system (described in U.S. Pat. No. 6,419,186, Classes 73/182 and 244/17.11, 2002) comprising various units. These include, in particular, the pitot pressure probe with sensing ports, equipped with anti-icing electric heaters. The pitot pressure probes are installed on the aircraft and connected via the conduits to the pressure transducer unit. The system may also include outer air temperature sensors (and total temperature sensors). Signals from these pressure/temperature sensors are sent into the onboard computer which uses the preliminary calibration information to calculate aircraft flight parameters. In such a measurement system the pitot pressure probes are usually located over the aircraft fuselage, whereas the other units (including the power supply) are mounted inside the aircraft.

Note weaknesses of the previous-art proposal:
the system is not autonomous;
it takes a long time to prepare the aircraft to flight after a failure is detected;
the anti-icing system requires much power;
design of electric heaters for the pitot pressure probe is complicated;
the device structure is heavy-weight;
it is difficult to adapt the system design to a fuselage nose shape change and/or a different-type aircraft;
it is costly and time-consuming to adapt the ready-made system to a fuselage nose shape change and/or a different-type aircraft;
ranges of flight parameters measured are narrow.

Let us consider each of the weakness statements in detail.

1. "The system is not autonomous". The individual units and components of the system are mounted outside and inside the fuselage; this dramatically complicates troubleshooting.

2. "It takes a long time to detect failures of components of the system". This drawback, in its essence, is a consequence of item 1 above. The result is the long duration of preparing the aircraft to flight after a failure is detected.

3. "The anti-icing system requires much power". This is caused by the fact that pitot pressure probes in the system must be installed on the fuselage so that the sensing ports protrude farther than the boundary layer (to minimize errors due to total pressure loss); dimensions of many types of aircraft are very large, so struts of previous-art pitot pressure probes are as long as 150 to 200 mm. This results in considerable power consumption for anti-icing protection—say, 500 W per pitot pressure probe, whose total number on civil airplanes shall be three or four as stated in international regulations.

4. "Design of electric heaters for the pitot pressure probe is complicated". This is due to the following circumstances: pitot pressure probes in these systems are heated with special tubular electric heaters which are wound within the probe compartment, that incorporates not only the electric heater but also air conduits, static pressure chambers, and hotwells.

5. "The device structure is heavy-weight". This is an implication of a number of factors: first, the pitot pressure probes in these systems are as heavy as 1 kg per probe because they are large size (see the analysis above); second, the system is distributed in the fuselage, which requires long links such as conduits. This, in turn, increases the overall weight.

6. "It is difficult to adapt the system design to a fuselage nose shape change and/or a different-type aircraft". The pitot pressure probes in the system are usually attached to the fuselage nose. In the case of even a slight modification to the fuselage nose the flow pattern here may change dramatically, thus changing the near-probe flow parameters and probe calibration characteristics. To update the calibration diagrams stored in the onboard computer memory, the comprehensive set of testing in wind tunnels and/or in calibration flights must be carried out, covering the entire flight envelope (including variation of Mach number, angles of attack and sideslip, etc.); thereafter, the flight parameter determination algorithms must be updated and downloaded into the onboard computer.

7. "It is very time-consuming and costly to adapt the ready-made system to a fuselage nose shape change and/or a different-type aircraft". This immediately follows from item 6 above.

8. "Ranges of flight parameters measured are narrow". First of all, this disadvantage is caused by the narrow working ranges of pitot pressure probes of the present kind (e.g., angle of attack from −30 to +30°). Four high-performance pin-type probes can be mounted properly on the fuselage nose, which may help expand the flight parameter measurement range to [−90°, +90°] for both angle of attack and sideslip angle; this means that flight parameters are possible to measure within the forward hemisphere as a whole. However, many missions of the nowadays aviation require the flight parameter measurement range to be much wider, covering the entirety of both the forward and aft hemisphere. But the system described fails to service the backward flight because the "forward-looking" probes are embedded in separated flow and/or thick boundary-layer.

The proposed invention is intended to eliminate the weaknesses above. The technical solution ensures the following: making the system autonomous;
shortening the duration of preparing the aircraft to flight after a failure is detected;
reducing the power requirement of the anti-icing system
simplifying the design of electric heaters for pitot pressure probes;
reducing the weight of the air data system structure as a whole;
simplifying the adaptation of the system design to a fuselage nose shape change and/or a different-type aircraft;
lowering the total work hours and costs of adapting the ready-made system to a fuselage nose shape change and/or a different-type aircraft;
expanding ranges of flight parameters measured, from −180 to +180 degrees for both angle of attack and sideslip angle (thus covering the entire sphere).

The technical result is achieved due to the fact that the air data system which includes pitot pressure probes with sensing ports, anti-icing electric heaters, conduits, pressure transducers, outer air temperature sensors, and onboard computer is designed such that the above units and components are incorporated in a single streamlined housing attached to the aircraft and composed of axisymmetric surfaces such as a cone, ellipsoid, cylinder, pyramid, etc., and the very system for acquiring air data is autonomous and interacts with the aircraft and other subsystems through only the information exchange channels and power supply lines via electric connectors.

To make the air data system more autonomous, its housing may also incorporate electric adapters, thus becoming also autonomous in respect of its power supply features.

To expand the measurement range, to save structural weight, to diminish the necessary number of pressure measurement channels, the air data system includes pitot pressure probes which are the faceted pins protruding from the housing and having the sensing ports.

On a particular aircraft, to reduce its structural weight, anti-icing system power requirements, and costs the air data system shall include one to four pitot pressure probes being faceted pins.

To simplify the pitot pressure probe heater design, the electric heaters in the pitot pressure probe anti-icing system of the air data system may be located within the housing.

To make the air data system more autonomous, to shorten duration of preparing the aircraft to flight after detecting a system failure, to simplify adaptation of the system design to a fuselage nose shape change and/or a different-type aircraft, to lower the total work hours and costs of adapting the ready-made system to a fuselage nose shape change and/or a different-type aircraft, and to expand the flight parameter measurement ranges, the outer air temperature sensors of the system are located in a separate compartment which is thermally isolated from other components and takes the outer air through holes in the housing.

To reduce anti-icing system power requirements and simplify the air data system design, the housing surface or a part thereof can be made of hydrophobic materials.

To expand ranges of flight parameters measured, from −180 to +180 degrees for both angle of attack and sideslip angle (thus covering the entire sphere), the system can include a plurality of independent subsystems; in each of the subsystems the units and components are housed in an individual streamlined housing attached to aircraft components, and the air data subsystems are autonomous and interact with the aircraft and other subsystems through only the information exchange channels and power supply lines.

To improve measurement reliability, the air data system is equipped with an information interface and an electric connector to be able to interchange information with other similar subsystems via a data bus; this enables them to form a multichannel complex.

To expand the measurement range and reduce measurement errors while saving the structural weight, the air data system can be composed of two subsystems such that in each of them a housing is a streamlined axisymmetric body equipped with two pitot pressure probes being faceted pins, each pin has six sensing ports, the axis of each pin is normal to the housing surface and makes an angle $\phi=86\text{-}96$ degrees to the other pin as seen in the cross section of the housing.

To reduce weight and cost of the air data system, the number of sensing ports in each pitot pressure probe may be equal to five.

To reduce weight and expand the air data measurement range, the system can comprise two subsystems such that in each of them the housing at the lateral side being outer relative to the aircraft carries two faceted-pin probes, each probe has five or six sensing ports, the axis of each pin is normal to the housing surface and, relative to the plane including the housing's axis and being parallel to the aircraft center line, makes the angle $\psi=+(43\text{-}48)°$ for the first pin and the angle $\psi=-(43\text{-}48)°$ for the second pin.

If the aircraft has no wings (which may be a case in helicopter technology), then each of the two subsystems can have a strut for attachment to the fuselage.

In case a narrower range of flight parameter measurement is required, the other version of the system may be resorted to, in which each of the subsystems has a single pitot pressure probe being a faceted pin, and the axis of each pin is normal to the housing surface.

In particular, in such a system the axis of each pin may be in the plane parallel to a plane including the aircraft center line and normal to the aircraft symmetry plane.

In the proposed system, all units and elements are located in a housing and are not distributed within/outside the fuselage, in opposition to the previous-art system; therefore, the proposed system is autonomous and interacts with other aircraft systems through only the information interchange channels and the power supply line. This feature notably simplifies troubleshooting and saves time for failure detection. In addition, as the proposed system is autonomous, all of its units are incorporated in a single streamlined housing attached to the aircraft and composed of axisymmetric surfaces such as a cone, ellipsoid, cylinder, pyramid, etc. The air data system interacts with the aircraft and other aircraft systems through only the information interchange channels and the power supply line, i.e., via an electric connector. Therefore, if a failure is detected, the unserviceable (inoperative) system may be simply detached from the aircraft element and simply replaced with an identical operative system. This notably shortens the duration of preparing the aircraft to flight after a failure is detected. In view of the state of the art, all the units and components of the system could be incorporated in a housing whose diameter is 100 to 200 mm, and length, 400 to 700 mm, depending on the total number of measurement channels. The boundary layer over such a body at very low speeds (of, say, 5 m/s) is as thin as 3 to 5 mm, which is by a factor of 40 to 60 less than the thickness of boundary layer over a fuselage of today's long-haul airplane at a noticeably higher landing-speed (of 70 m/s). Thus, to minimize total pressure loss, the pitot pressure probes protruding from the housing of the proposed system may be much smaller and get much lighter-weight (by a factor of ten and higher). It is known that the power required for heating is proportional to the external surface area; therefore, in the proposed system the pitot pressure probe heater power requirement is lowered considerably (strictly speaking, this statement is true in the case of dealing with the same kind of flow pattern around the body). The pitot pressure probes protruding from the housing of the proposed system are very small, so their electric heaters may be located within the housing such that the pins are heated due to heat conduction along the pin (as in the soldering iron)—in opposition to the previous-art system in which the electric heaters are located within the very probes. This feature considerably decreases structural weight. Moreover, because the invention considerably reduces the probe dimensions and weight and the electric heater power requirement (and weight) the overall weight of the structure of the system may be decreased notably. For example, weight of a previous-art probe with electric heater on a long-haul airplane is 1.2 to 1.5 kg, whereas weight of the proposed system is estimated to be 100 to 200 g. Note that the weight of the proposed system is considerably reduced (in comparison with the previous-art system) due also to shortening the links between components (e.g., the conduits may be shortened by a factor of hundred and more). As said above, the air data system is an autonomous unit whose housing carries sensing orifices or pitot pressure probes; therefore, it is much simpler to adapt the system design to a fuselage nose shape change and/or a different-type aircraft. For instance, if one mounts two individual subsystems on wing tips, then any change to a fuselage shape (or introduction of any features on the fuselage surface) does not almost affect calibration characteristics of the system. In addition, the subsystems may be attached to struts at a distance from aircraft components. This considerably diminishes the influence of aircraft components on local flow parameters at the locations where the system has the sensing port. As the result, in some instances there does not appear the necessity to repeat the calibration tests—e.g., when the system is on the wing and the fuselage shape is changed. In addition, if struts separate the system from aircraft components, then there is no need to calibrate the system in combination with the aircraft; the only necessary activity is measuring the flow parameters at system location, which provides some correction coefficients. These features ensure notable reduction of work hours and costs of adapting the system to a fuselage nose shape change and/or a different-type aircraft. The proposed system notably expands ranges of flight parameters measured, from −180 to +180 degrees for both angle of attack and sideslip angle (thus covering the entire sphere). Indeed, the system (especially in case it is subdivided into subsystems) makes it possible to distribute over the aircraft the sensors in such a pattern that measurements may be taken within the entire spatial sphere and, which is very important, the number of the sensors may be rather low. For example, in case the system includes two wingtip mounted subsystems, each having two faceted pins with five or six sensing ports, the onboard computer can calculate all flight parameters at any angles of attack and sideslip. This is due to the following circumstances. First, boundary layer over the housing is very thin, and during forward or backward flight all the sensing ports are not covered with the boundary layer. Second, whichever flight direction is specified (fore and aft, to the right and to the left, upwards and downwards, etc.), there exist algorithms for selecting two probes (from the four) whose locations feature separation-free flow. Readings from the two probes can be processed on the basis of calibration plots to determine flight parameters (the three speed components, first of all; thereafter, angles of attack and sideslip, flight altitude, etc.).

To make the system more autonomous, it may include an internal power adapter and a set of outer air temperature sensors located in a separate compartment which is thermally isolated from other components and takes the outer air through holes in the housing.

To reduce the anti-icing system power requirement, to simplify heater concept and to save structural weight, the air data system can include pitot pressure probes being faceted pins, between edges of which the sensing port are made, protruding into the air flow. Depending on requirements for measurement ranges and failure tolerance, the number of the pitot pressure probes may be from one to four. These pitot pressure probes are small; therefore, to simplify the design, the electric heaters for pitot pressure probes can be located within the housing. To additionally reduce anti-icing system power requirements and improve measurement accuracy, the housing surface or a part thereof can be made of hydrophobic materials.

To simplify adaptation of the system to a fuselage nose shape change and/or a different-type aircraft, to lower the total work hours and costs of adapting the system and to expand ranges of flight parameters measured, from −180 to +180 degrees for both angle of attack and sideslip angle (thus covering the entire sphere), the air data system can be composed of a set of independent subsystems; in each of the subsystems all units and components are housed in an individual streamlined housing attached to aircraft components, and the air data subsystems are autonomous and interact with the aircraft, its subsystems and other similar air data systems through only the information exchange channels and power supply lines. In particular, the system can comprise two subsystems such that in each of them the housing carries two faceted-pin probes, each probe has five or six sensing ports, the axis of each pin is normal to the housing surface. If the housing of a subsystem carries two pitot pressure probes whose axes make an angle $\phi=86\text{-}96°$ to one the other, and the housing attachment fittings on a particular side of the housing are attached, say, to wing tips so that the longitudinal axis of each subsystem is parallel to the aircraft symmetry plane and, relative to the plane including the housing's axis and being normal to the aircraft symmetry plane, makes the angle $\psi=+(43\text{-}48)°$, then there additionally appears the ability to measure the angle of attack and sideslip from −180 to +180° because among the four pitot pressure probes we always can reveal two probes whose locations feature laminar (separation-free) flow and whose local signals can be processed on the basis of calibration plots to obtain true flight parameters. On an unwinged aircraft the subsystem housings can be mounted on tips of special struts which place the subsystem in a "smooth" flow. In case a narrower range of flight parameter measurement is specified, the other version of the air data system may be resorted to, in which the housing of each of the subsystems carries a single pitot pressure probe being a faceted pin.

FIG. 1 shows one of versions of the air data system.

FIG. 2 demonstrates a version of the system whose housing carries the power adapter.

FIG. 3 shows the version of the system the includes pitot pressure probes being the protruding faceted pins, between edges of which the sensing ports are made FIG. 4 through 7 provide versions of the system with various numbers of pitot pressure probes being faceted pins.

Figure 10:
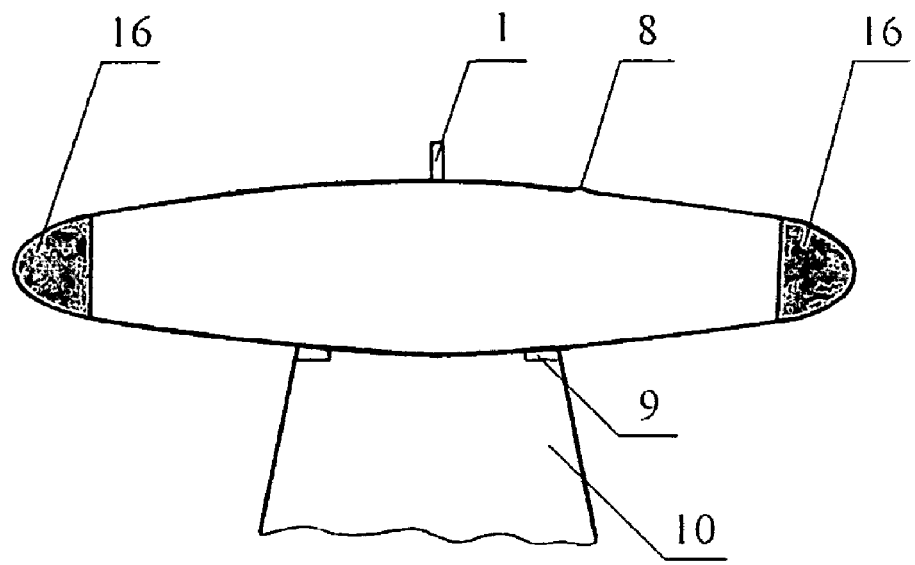
Figure 11:
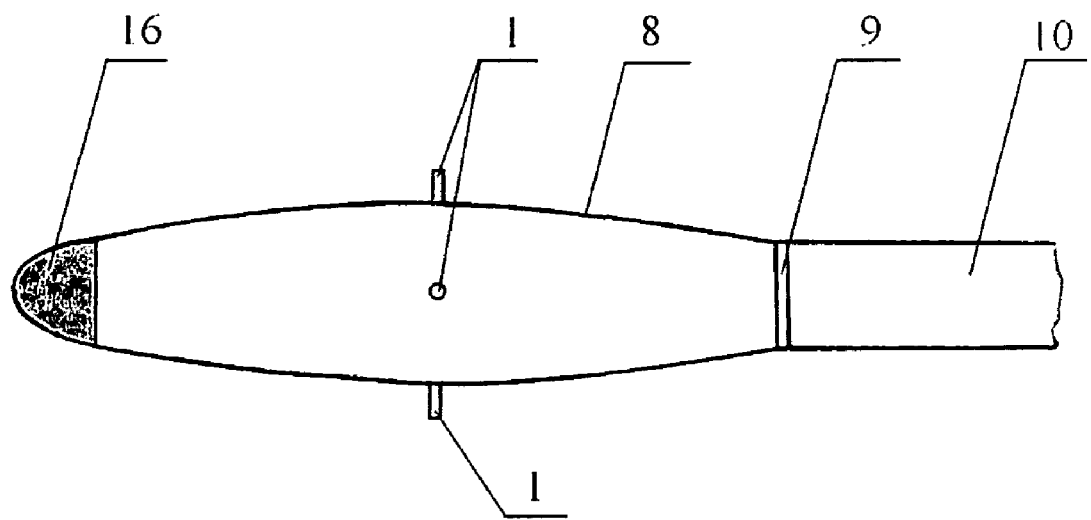

FIGS. 10 and 11 demonstrate versions of the system in which the housing has a hydrophobic coating.

FIGS. 12 and 13 show versions of the system composed of a plurality of subsystems; in each of them the units are housed in an individual streamlined housing (with holes for taking in the air) attached to an aircraft component, and the air data subsystems are autonomous and interact with the aircraft and the other subsystems through only the information exchange channels and power supply lines.

FIG. 14 provides a version of the system composed of two subsystems such that in each of them a housing is a streamlined axisymmetric body equipped with two pitot pressure probes being faceted pins, each pin has six sensing ports, the axis of each pin is normal to the housing surface and makes an angle $\phi=86$-$96$ degrees to the other pin as seen in the cross section of the housing.

FIG. 15 depicts the version of the system which differs from that in FIG. 14 in what concerns the number of probe sensing ports which equals five.

Figure 16:
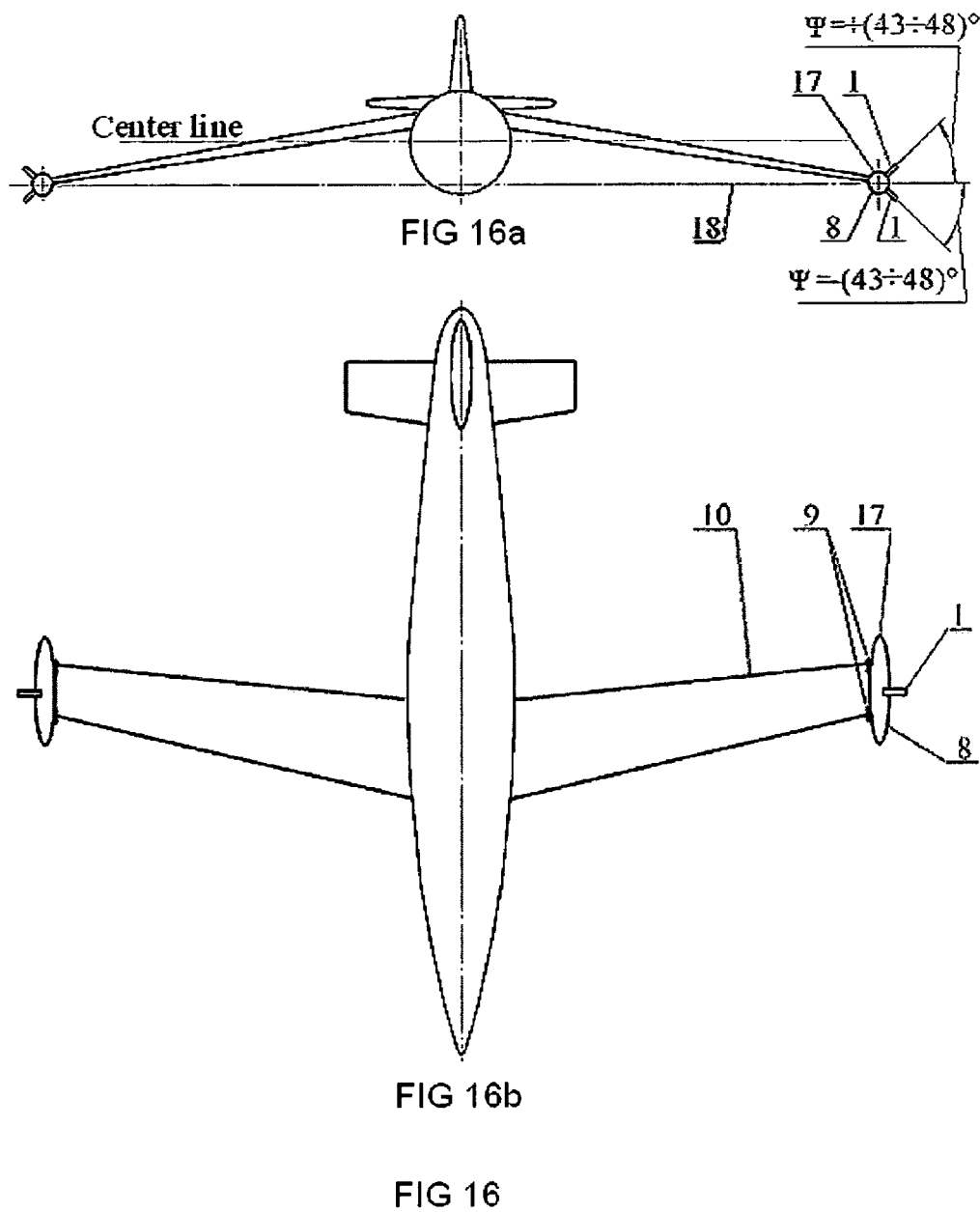

FIG. 16 represents the version of the system composed of two subsystems such that in each of them the housing at one side has attachment fittings which attach the subsystem to wing tip in such a manner that the pitot pressure probes are at the other side of the housing, the pin axis makes the angle $\psi=+(43$-$48)°$ for the first pin and the angle $\psi=-(43$-$48)°$ for the second pin, relative to the plane including the housing's axis and being parallel to the aircraft center line.

FIG. 17 demonstrates the system which differs from that in FIG. 16: in each of the two subsystems the housing at one lateral side has a strut for attachment to the aircraft fuselage.

FIG. 18 shows the air data system in which each subsystem includes a single pitot pressure probe being a faceted pin wherein the number of sensing ports may be five or six and the pin axis is normal to the housing surface.

Figure 19:
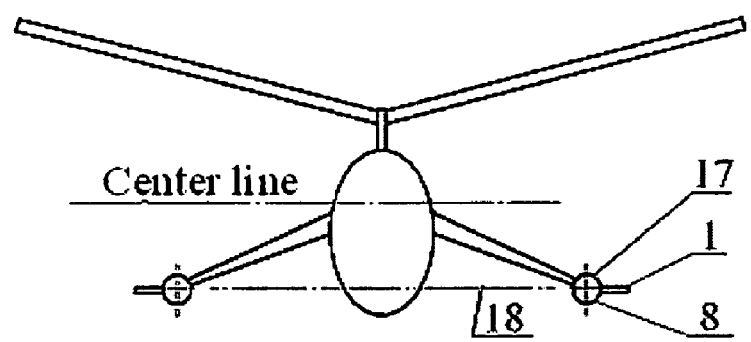
Figure 19:
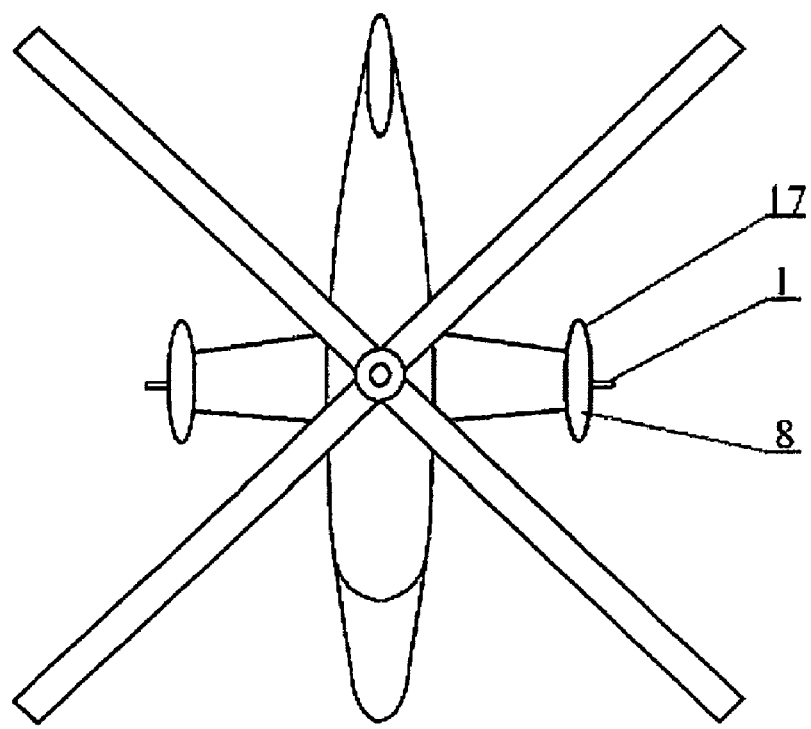

FIG. 19 shows the system which differs from that in FIGS. 16 and 18: probe axes are in the plane parallel to the aircraft center line and normal to the aircraft symmetry axis.

The air data system includes the pitot pressure probe 1 with sensing ports 2, anti-icing system electric heaters 3, conduits 4, pressure transducers 5, outer air temperature sensors 6, and onboard computer 7. All the units are in the streamlined housing 8 attached by attachment fittings 9 to the aircraft component 10. The system is autonomous and interacts with other aircraft systems through only the information interchange and power supply lines 11 with connectors 12.

The air data system operates as follows (refer to FIG. 1).

Pressure taken by sensing port 2 in pitot pressure probe 1 is transferred by conduit 4 to pressure transducer 5. To prevent ice accretion, orifice clogging, and the influence of the ice on measurements, the pitot pressure probes are provided with anti-icing system electric heaters 3. The pressure transducers 5 convert pressure into electric signals that are sent into onboard computer 7.

Electric signals from outer air temperature sensors 6 are also sent into onboard computer 7 which uses the calibration plots and algorithms to determine flow (flight) parameters: static and pitot pressure, angles of attack and sideslip, as well as all necessary functions thereof.

Figure 2:
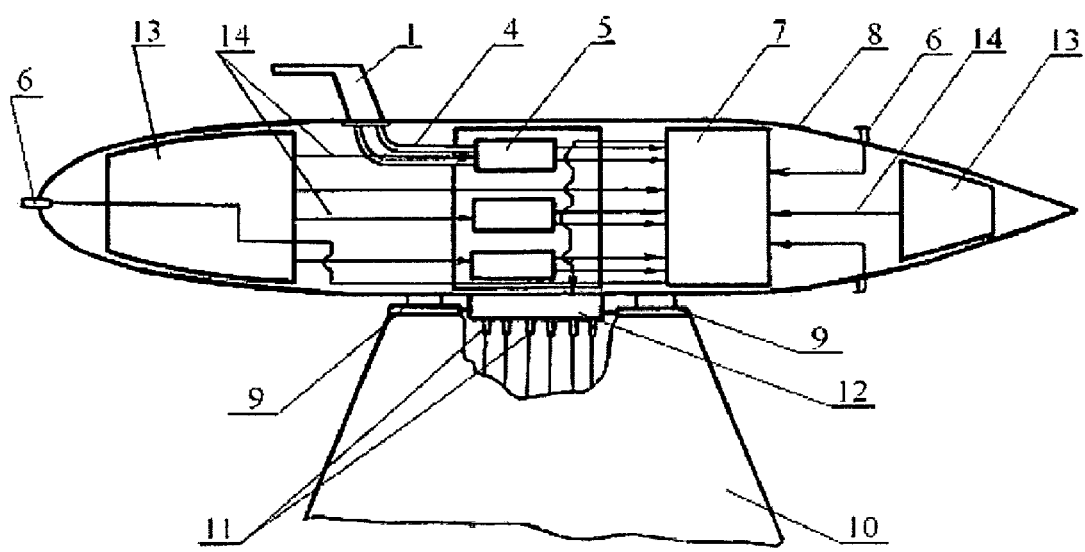

To make the system more autonomous, the housing 8 of the air data system (FIG. 2) can carry power adapters 13 that supply energy through lines (channels) 14 to pressure transducers 5 and onboard computer 7.

To expand the measurement range, to diminish the necessary number of pressure measurement channels and save structural weight, the air data system can include (FIG. 3) pitot pressure probes which are the faceted pins 1 protruding from housing 8 and having sensing ports 2.

Depending on requirements for measurement ranges and failure tolerance, the number of the pitot pressure probes may be from one to four (FIGS. 4 through 7).

Figure 8:
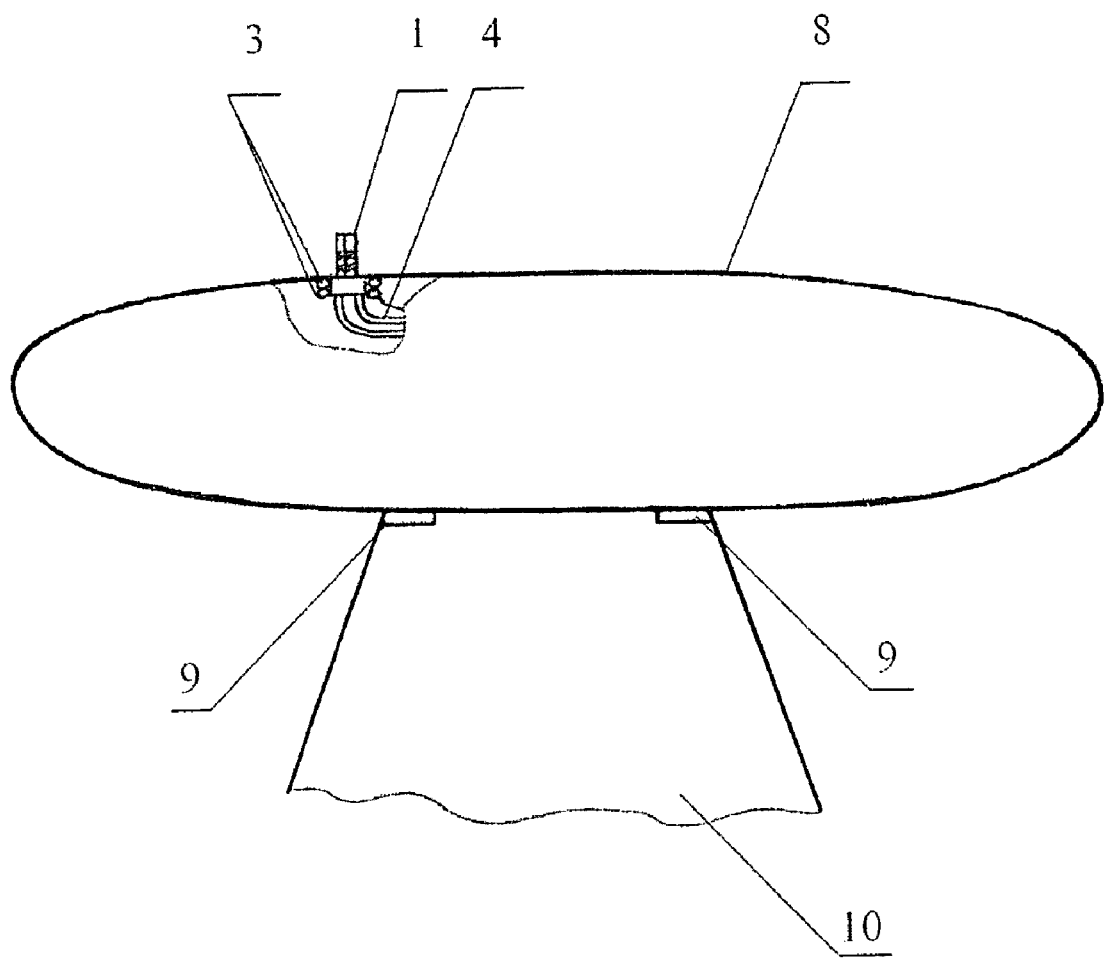
FIG. 8 depicts a version of the system with probe electric heaters located within the housing.

To simplify the design, electric heater 3 of the pitot pressure probes 1 can be located in housing 8 (FIG. 8).

Figure 9:
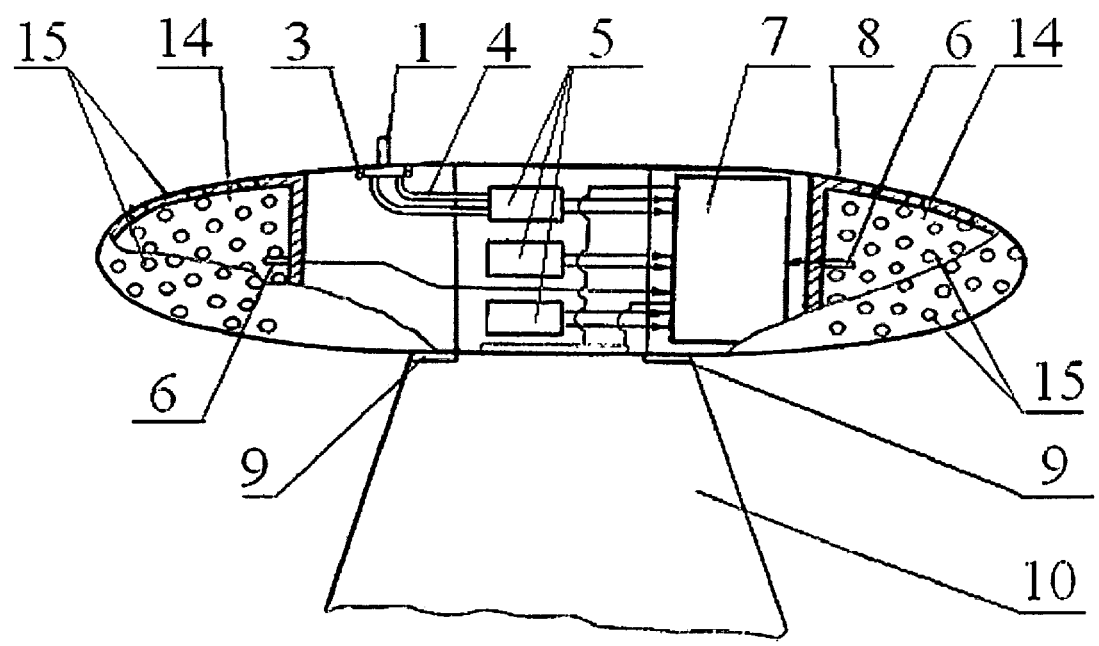
FIG. 9 represents the version of the system with outer air temperature sensors located in separate compartments which are thermally isolated from other components and take the outer air through holes in the housing.

To simplify the design and improve measurement accuracy, outer air temperature sensors 6 can be located in separate compartments 14 which are thermally isolated from other components and take the outer air through holes 15 in housing 8 (FIG. 9).

To additionally reduce anti-icing system power requirements and improve measurement accuracy, housing surface 8 or a part thereof may be made of hydrophobic materials. Versions of parts of housing 8 with a hydrophobic coating are demonstrated in FIGS. 10 and 11.

To improve measurement reliability, to simplify adaptation of the system design to a fuselage shape change and/or a different-type aircraft, to lower the total work hours and costs of adaptation and expand ranges of flight parameters measured, from $-180$ to $+180$ degrees for both angle of attack and sideslip angle (thus covering the entire sphere), the air data system may be composed of independent subsystems 17 (FIGS. 12 and 13); in each of them the units are housed in an individual streamlined housing attached to an aircraft component, and the air data subsystem 17 is autonomous and interacts with the aircraft and the other identical subsystems through only information exchange and power supply lines 11.

To simplify the system and save its weight, the system can, in particular, comprise (FIGS. 14 through 19) two subsystems 17 with pitot pressure probes being faceted pins 1, each pin having six sensing ports 2 and the axis of each pin being normal to the surface of housing 8 and making an angle $\phi=86$-$96$ degrees to the other pin as seen in the cross section of the housing.

To simplify the system and reduce its weight and cost, the air data system can comprise two subsystems 17 in which each pitot pressure probe has five sensing ports (1 and 2 in FIG. 15).

To reduce weight and expand the measurement range, the system can comprise two subsystems 17 (FIG. 16) such that in each of them the housing at the lateral side being outer relative to the aircraft carries two faceted-pin probes 1, each probe has five or six sensing ports 2, the axis of each pin is normal to the surface of housing 8 and, relative to the plane 18 being parallel to the aircraft center line, makes the angle $\psi=+(43$-$48)°$ for the first pin and the angle $\psi=-(43$-$48)°$ for the second pin.

If the aircraft has no wings (which may be a case in helicopter technology), then each of the two subsystems 17 can have a strut for attachment to the fuselage (FIG. 17).

In case a narrower range of flight parameter measurement is specified, the other version of the system may be resorted to, in which each of subsystems 17 has a single pitot pressure probe being a faceted pin, and the axis of each pin 1 is normal to the surface of housing 8 (FIG. 18).

In particular, in such a system the axis of each pin 1 may be in plane 18 parallel to a plane including the aircraft center line and normal to the aircraft symmetry plane (FIG. 19).

What is claimed is:

1. An air data system including pitot pressure probes with sensing ports, anti-icing electric heaters, conduits, pressure transducers, outer air temperature sensors, and onboard computer wherein the above units and components are incorporated in a single streamlined housing attached to the aircraft and composed of axisymmetric surfaces such as a cone, ellipsoid, cylinder, and pyramid, said system for air data acquisition being autonomous and interacting with the aircraft and other subsystems through only the information exchange channels and power supply lines via electric connectors.

2. The air data system of claim 1, wherein the housing incorporates power adapters, so the system is autonomous in respect of its power supply features.

3. The air data system of claim 1, wherein the pitot pressure probes are the faceted pins protruding into the air flow and having sensing ports between their edges.

4. The air data system of claim 3, wherein the number of pitot pressure probes is from one to four.

5. The air data system of claim 1, wherein outer air temperature sensors are located in separate compartments of the housing which are thermally isolated from other components and take the outer air through holes in the housing.

6. The air data system of claim 1, wherein the housing surface is made of hydrophobic materials.

7. The air data system of claim 1, wherein, to expand ranges of measured flight parameters from −180 to +180 degrees for both angle of attack and sideslip angle (thus covering the entire sphere), the system is composed of a plurality of subsystems, in each of them the units are housed in an individual streamlined housing attached to an aircraft component, and the air data subsystem is autonomous and interacts with the aircraft and the other identical subsystems through only information exchange channels and power supply lines.

8. The air data system of claim 7, wherein said system is equipped with an information interface and an electric connector to be able to interchange information with other similar subsystems via a data bus; this enables them to form a multichannel complex, thus improving measurement reliability.

9. The air data system of claim 1, wherein said the system comprises two subsystems such that in each of them a housing is a streamlined axisymmetric body equipped with two pitot pressure probes being faceted pins, each pin has six sensing ports, and the axis of each pin is perpendicular to the housing surface and makes an angle of 86-96 degrees to the other pin as seen in the cross section of the housing.

10. The air data system of claim 9, wherein the number of sensing ports in each pitot pressure probe equals five.

11. The air data system of claim 9, wherein said housing at the lateral side being outer relative to the aircraft carries two faceted-pin probes, each probe has five or six sensing ports, and the axis of each pin is perpendicular to the housing surface and, relative to the plane being parallel to the aircraft center line and including the housing's longitudinal axis, makes the angle $\psi+(43-48)°$ for the first pin and the angle $\psi=-(43-48)°$ for the second pin.

12. The air data system of claim 9, wherein one of the lateral sides of the housing in each subsystem has a strut for attaching the housing to the fuselage.

13. The air data system of claim 7, wherein each subsystem has a single pitot pressure probe being a faceted pin whose axis is perpendicular to the housing surface.

14. The air data system of claim 11, wherein the axis of each pin is in the plane parallel to a plane including the aircraft center line and perpendicular to the aircraft symmetry plane.

* * * * *